United States Patent [19]

Windle

[11] 3,844,819
[45] Oct. 29, 1974

[54] COATING OF PAPER

[75] Inventor: William Windle, Cornwall, England

[73] Assignee: English Clays Lovering Pochin & Company Limited, Anstell, Cornwall, England

[22] Filed: Feb. 2, 1973

[21] Appl. No.: 329,199

Related U.S. Application Data

[63] Continuation-in-part of Ser. No. 92,514, Nov. 24, 1970, abandoned, which is a continuation-in-part of Ser. No. 711,881, March 11, 1968, abandoned.

[52] U.S. Cl.......... 117/65.2, 106/214, 117/155 UA, 117/156
[51] Int. Cl............................................. C08b 25/00
[58] Field of Search..... 106/214; 117/155 UA, 65.2, 117/64

[56] References Cited
UNITED STATES PATENTS

| | | | |
|---|---|---|---|
| 3,222,209 | 12/1965 | Brundige | 117/65.2 |
| 3,224,897 | 12/1965 | Smith | 117/155 UA |
| 3,281,267 | 10/1966 | Rice | 117/155 UA |
| 3,413,139 | 11/1968 | Rasmussen et al. | 117/65.2 |

FOREIGN PATENTS OR APPLICATIONS 453,320   12/1948   Canada

*Primary Examiner*—Theodore Morris
*Attorney, Agent, or Firm*—Cushman, Darby & Cushman

[57] ABSTRACT

A coating paper having a semi-matt finish is produced by coating a base paper with a composition which comprises a dispersion of a pigment in an aqueous medium containing an adhesive, said pigment comprising (a) a clay, of which at least 75 percent by weight of the particles have an equivalent spherical diameter smaller than 2 microns and (b) a calcium carbonate pigment which is a natural chalk and which constitutes from 40 percent to 75 percent by weight of the pigment, and thereafter subjecting said coated paper to a light supercalendering treatment.

5 Claims, No Drawings

COATING OF PAPER

This is a continuation-in-part application of my earlier U.S. patent application, Ser. Number No. 92,514 filed Nov. 24, 1970 which was a continuation-in-part of my patent application, Ser. No. 711,881, filed Mar. 11, 1968, both of which are now abandoned.

BACKGROUND OF THE INVENTION

This invention relates to the coating of paper and, more particularly, is concerned with a method of producing a coated paper having a semi-matt finish, that is to say a surface with a gloss of from 15 to 30 T.A.P.P.I. gloss units.

Many variaties of coated paper are produced today. Generally they are produced by coating a base paper with a coating composition (which is sometimes known as the coating color). A discussion of the constituents of paper coating compositions and of the methods of applying such coating compositions to paper is given in Chapter XIX, volume III, of the second edition of the book by James P. Casey entitled "Pulp and Paper: Chemistry and Technology."

The principal properties of a paper which are effected by coating are its smoothness, its ink receptivity and its gloss. The adhesive used in paper coating compositions can be, for example, an amylaceous or proteinaceous adhesive or an adhesive in the form of a resin or rubber latex; the particular adhesive used will depend inter alia on the printing process to be used, e.g. offset lithography requires the adhesive to be water-insoluble. Generally, the pigment used will consist of kaolin clay, as the main constituent, and minor amounts, i.e. less than 20 percent by weight, of one or more other constituents, for example calcium carbonate, lithopone, barium sulphate, titanium pigments talc or satin white. The clays normally used for paper coating purposes comprise at least 70 percent by weight of particles having an equivalent spherical diameter less than two microns and the gloss of the coated paper after supercalendering is seldom below 30 TAPPI gloss units.

The coating composition is usually prepared by dispersing the pigment and adhesive separately in water and then mixing the two components together. The coating composition is then applied to the surface of the paper by one of a number of alternative paper coating techniques, dried and subjected to a finishing process, e.g. calendering or glazing.

In paper prepared for advertising matter such as periodicals, high gloss, i.e. 30 TAPPI gloss units or higher, is usually considered to be desirable as it gives good contrast to the half tone prints and generally has good eye appeal. However, in other forms of commercial advertising, a demand exists for a coated paper which would have good printing properties but which would have a semi-matt finish.

As is well known to those skilled in the art of paper coating, the calcium carbonate used in paper coating compositions usually consists of a chemically prepared material known as precipitated calcium carbonate which is seldom used in an amount constituting more than about 20 percent by weight of the total pigments. There are natural sources of calcium carbonate, such as marble, chalk, shells of mollusks, eggshells, coral and pearl, but hitherto naturally occurring calcium carbonates have never been found useful and competitive with precipitated calcium carbonate in the paper coating art, inter alia because it has been considered that they do not produce as fine a quality coating.

The fact that natural chalk and other forms of natural calcium carbonate have not found commercial use in the paper coating trade is well documented and reference may be made, for example, to The Encyclopedia of Chemical Technology, by Kirk-Othmer, 2nd Edition, under the discussion of calcium carbonate in Vol. 4 pages 7–11 and under the discussion of paper pigments, Vol. 14, pages 515–517. In addition, Canadian Patent 453,320, issued on Dec. 14, 1948 to Harold R. Rafton specifically mentions at page 15, column 27, lines 28–52, page 23, column 45, lines 40–58 and column 46, lines 56–65 that paper coated with naturally occurring calcium carbonates does not have the quality of that coated with precipitated calcium carbonate.

SUMMARY OF THE INVENTION

According to the present invention there is provided a method of producing a coated paper having a semi-matt finish which method comprises (A) coating a base paper with a paper coating composition which comprises a dispersion of a pigment in an aqueous medium containing an adhesive, said pigment essentially consisting of (a) a kaolin clay, of which at least 75 percent by weight of the particles have an equivalent spherical diameter smaller than two microns, and having no particles having an equivalent spherical diameter larger than 100 microns and (b) a calcium carbonate pigment which is a natural chalk whiting formed from the remains of coccoliths and which constitutes from 40 to 75 percent by weight of the pigment, and (B) subjecting the coated base paper to a light supercalendering treatment in which the product of the number of passes of the coated paper between the nip of a pair of supercalendering rolls and the effective line pressure, in pounds per linear inch, does not exceed about 2,500 and the effective line pressure does not exceed about 500 pounds per linear inch.

The calcium carbonate pigment used in the present invention is a material obtained by grinding naturally occurring chalk which is a material formed in the cretaceous period of geological history from the remains of coccoliths. Natural chalk consists of calcite crystals in the form of particles mainly having an equivalent spherical diameter in the range 1 to 5 microns which are loosely bound together, and is to be distinguished from precipitated calcium carbonate and from other natural calcium carbonate sources such as ground limestone, marble or oyster shells. The calcite crystals of natural chalk are predominantly rounded in shape so that, when the chalk whiting is incorporated in a paper coating composition, a higher proportion of the light incident on the coated paper is reflected diffusely than is the case when the pigment comprises the more angular calcium carbonate particles obtained, for example, by grinding limestone which tend to reflect more of the incident light in a regular manner. Thus, the natural chalk whiting used in the present invention gives a more matt finish than the other forms of calcium carbonate on a weight for weight basis.

The coating compositions used in the present invention can be applied to a base paper in any conventional manner but are preferably applied using a blade coater.

If a base paper is coated with a paper coating composition formulated in accordance with this invention and then subjected to a light supercalendering treatment in accordance with the invention, a coated paper can be produced which has a low gloss, or semi-matt, finish but which is smooth and has desirable printing properties. The normal supercalendering treatment for a sheet of coated paper is to pass the sheet between 8 or 10 nips of a stack of supercalender rolls, usually at an elevated temperature, with a normal effective line pressure between the rolls of 800 – 1,200 pounds/linear inch so that the product of the number of passes of the coated paper between the nip of a pair of supercalendering rolls and the effective line pressure in pounds per linear inch, is in the approximate range 6,400 to 12,000. The light super-calendering treatment used in the method of the present invention can consist, for example, of from 5 to 10 passes at 250 pounds/linear inch or fewer passes at a somewhat higher pressure, e.g. 2 – 5 passes at 500 pounds/linear inch; effective pressures significantly above this latter figure should not be used. The stack of supercalender rolls can be at a temperature ranging from room temperature to about 100° C.

DESCRIPTION OF THE PREFERRED EMBODIMENTS

Preferably, the kaolin clay contains from 75 to 85 percent by weight of particles smaller than 2 microns equivalent spherical diameter, not more than 0.5 percent by weight of particles larger than 10 microns equivalent spherical diameter and not more than 0.02 percent by weight of particles larger than a No. 300 mesh B.S. sieve with no particles larger than 75 microns.

Advantageously, the natural chalk whiting comprises from 30 to 50 percent by weight of particles having an equivalent spherical diameter less than 2 microns with no particles larger than 100 microns. The natural chalk whiting used in the coating composition of the present invention can be prepared from natural chalk by any conventional process capable of producing a product with the desired particle size analysis. Preferably the natural chalk whiting is produced by means of the process which is the subject of U.S. Pat. No. 3,534,911, issued on Oct. 20, 1970, and assigned to the same assignee as this application. The entire disclosure of U.S. Pat. No. 3,534,911 is incorporated herein by reference. Briefly, the process described in U.S. Pat. No. 3,534,911 comprises the steps of (a) grinding a crude natural chalk containing hard impurities in an aqueous medium at a solids content in the range of from 60 to 75 percent by weight and in the presence of from 0.05 to 0.50 percent by weight, based on the weight of chalk, of a dispersing agent, for example, a salt of a polyphosphoric acid, a salt of a polysilicic acid, a salt of a polyacrylic acid, a salt of a polymethacrylic acid, a dinaphthylmethane sulphonate, a lignosulphonate or an alginate, e.g. sodium alginate, based on the weight of chalk, for a time sufficient to form a fluid suspension of the natural chalk particles, (b) separating the fluid suspension of natural chalk particles thus formed from the hard impurities and (c) drying the suspension of chalk particles to obtain a natural chalk whiting having a dispersing agent deposited thereon.

The adhesive used in the coating composition of the present invention can be a conventional adhesive used in paper coating and may be, for example, any amylaceous or proteinaceous adhesive or an adhesive formed from a synthetic resin or rubber latex. Examples of suitable adhesives are:

casein; soybean protein, e.g. soy flour, and isolated soybean protein; starch, e.g. dextrins (from corn) oxidised starches (from corn or potato), enzyme-converted starches (from corn or tapioca) and chemically modified starches such as hydroxyethylated starches; gelatin; animal glue; corn protein, e.g. corn gluten and zein; polyvinyl alcohol (in aqueous solution or colloidal dispersion); cellulose derivatives, e.g. methyl cellulose, sodium carboxymethyl cellulose and hydroxyethyl cellulose; water-soluble alkyd resins; water-soluble vinyl resins; and synthetic resin latices and emulsions formed from styrene-butadiene copolymers; acrylic resins; butadieneacrylonitrile copolymers, butadiene-methyl methacrylate copolymers; poly(vinyl acetate), and copolymers of polyvinyl acetate and acrylates.

The proportions of adhesives and pigment used and the ratio of the refractive indices of the adhesive and pigment affect the optical properties of the paper coated therewith. Normally, the coating compositions of the invention will contain, for each 100 parts by weight of total pigment, from 10 to 25 parts by weight of adhesive and from 50 to 125 parts by weight of water, but the optimum amounts of adhesive and pigment which should be used to obtain a semi-matt finish in accordance with the present invention can be determined readily by simple experiments and by reference to the Examples given hereinafter which serve to illustrate the invention.

The coating composition may also contain conventional additives.

The invention is illustrated by the following Examples.

EXAMPLES 1 to 4

Sheets of a base paper were coated with various coating compositions, as identified in Table I below, using a high speed trailing blade coating apparatus of the type described in U.K. Specification No. 1,032,536 working at a paper speed of 1,500 ft/minute. In each composition there was employed, as adhesive, 17 parts by weight of starch per 100 parts by weight of the pigment. The coating clay used in the compositions contained 75 percent by weight of particles having an equivalent spherical diameter smaller than 2 microns and the natural chalk whiting containing 37 percent by weight of particles having an equivalent spherical diameter smaller than 2 microns.

After coating and supercalendering, on a two-roll laboratory supercalender, by 5 passes at an effective line pressure of 250 pounds/linear inch, various properties of the coated papers were measured and the results obtained are set forth in Table I below:

Table I

| Example No. | 1 | 2 | 3 | 4 |
|---|---|---|---|---|
| Pigment | Coating Clay | 60% Coating Clay 40% Natural Chalk Whiting | 50% Coating Clay 50% Natural Chalk Whiting | 25% Coating Clay 75% Natural Chalk Whiting |
| total[1] solids % | 60 | 62 | 63 | 64 |
| Coating weight g.s.m. | 13.1 | 12.9 | 13.2 | 13.1 |
| TAPPI Gloss United | 45 | 25 | 20 | 15 |

[1] Total solids % = total weight of solids/total weight of solids + total × 100% weight of water As the percentage of natural chalk whiting in the composition was increased, the viscosity of the coating composition decreased, and hence it could be coated at a higher solids content. Furthermore, it will be seen from the results given above that, as the percentage of natural chalk whiting was increased, the gloss of the sheet measured after the light super-calendering technique progressively decreased.

EXAMPLES 5 to 8

Sheets of a base paper were coated with various coating compositions, as identified in Table II below, using a high speed trailing blade coating apparatus of the type described in U.K. Specification No. 1,032,536 working at a paper speed of 1,500 ft/min. In each composition there was employed, as adhesive, 7 ½ parts by weight of casein and 7 ½ parts by weight of styrene/butadiene latex No. 636 (manufactured by the Dow Chemical Co. Ltd.) per 100 parts by weight of pigment. The coating clay used in the compositions contained 76 percent by weight of particles having an equivalent spherical diameter smaller than 2 microns and the natural chalk whiting contained 37 percent by weight of particles having an equivalent spherical diameter smaller than 2 microns.

After coating, and super-calendering on a two-roll laboratory supercalender by 5 passes at an effective line pressure of 250 pounds/linear inch, various properties of the coated papers were measured and the results obtained are set forth in Table II below:

sein/latex adhesive system gives a slightly higher gloss to the coated sheet and imparts a higher viscosity to the coating composition than does the starch adhesive.

EXAMPLE 9

Sheets of a base paper were coated with a coating composition comprising as pigment 50 percent by weight of a kaolin clay which had a particle size distribution such that 76 percent by weight consisted of particles having an equivalent spherical diameter smaller than 2 microns and 50 percent by weight of precipitated calcium carbonate pigment which had a median particle size 2.5 microns equivalent spherical diameter (i.e. approximately equivalent to the natural chalks used in Examples 1 to 8). The coating was applied by means of a high speed trailing blade coating apparatus of the type described in British Patent Specification No. 1,032,536 working at a paper speed of 1500 ft/minutes, and the adhesive comprised 17 parts by weight of starch per 100 parts by weight of the pigment.

After coating and supercalendering on a two-roll laboratory supercalender, by 5 passes at an effective line pressure of 250 pounds/linear inch, various properties of the coated papers were measured and the results obtained are set forth in Table III below.

The results obtained with the composition comprising 50 percent by weight of kaolin clay and 50 percent by weight of precipitated calcium carbonate are com-

TABLE II

| Example No. | Coating Clay | 60% Coating Clay 40% Natural Chalk Whiting | 50% Coating Clay 50% Natural Chalk Whiting | 25% Coating Clay 75% Natural Chalk Whiting |
|---|---|---|---|---|
| Total solids% | 55 | 58 | 61 | 63 |
| Coating weight g.s.m. | 13.2 | 13.0 | 12.8 | 13.1 |
| TAPPI glass units | 48 | 27 | 22 | 16 |

It will be seen that the trend of the maximum solids concentration of the coating compositions and of the gloss is the same as the previous Examples, but the ca- pared with those for the composition comprising 50 percent by weight of kaolin clay and 50 percent by weight of natural chalk as used in Example 3.

Table III

|  | Example No. 9 | Example No. 3 |
|---|---|---|
|  | Pigment | |
|  | 50% coating-grade kaolin clay and 50% precipitated calcium carbonate | 50% coating-grade kaolin clay and 50% natural chalk whiting |
| Total solids % | 61 | 63 |
| Coating weight gsm | 13.0 | 13.2 |
| TAPPI gloss units | 25 | 20 |
| I.G.T. pick velocity (ft/min) | 264 | 340 |

These results show that the coating composition containing natural chalk gives a lower gloss than that containing precipitated calcium carbonate but as the object of these compositions is to produce a coated sheet with a semi-matt finish the lower gloss is advantageous. The coating composition containing natural chalk has the additional advantages of being capable of coating at a higher solids content and of forming a stronger bond with the base paper for a given adhesive content as evidenced by the I.G.T. Pick Velocity results. Furthermore, the cost of manufacturing the natural chalk pigment is approximately one half to two thirds of the cost of manufacturing the precipitated calcium carbonate.

EXAMPLE 10

Sheets of a base paper were coated by means of a high speed trailing blade coating apparatus of the type described in U.K. Specification No. 1,032,536 working at a paper speed of 1,500 ft./min. The paper coating composition comprised 60 parts by weight of a coating clay having an equivalent spherical diameter smaller than 2 microns, 40 parts by weight of a natural chalk whiting containing 37 percent by weight of particles having an equivalent spherical diameter smaller than 2 microns, and, as the adhesive 17 parts by weight of starch. The composition was applied as an aqueous suspension having a total solids content of 62 percent by weight and, after drying, the weight of coating on the sheets was found to be 13 grams per square metre.

The air dry sheets were then subjected to supercalendering on a two-roll laboratory supercalender at 85°C and a speed of 120 feet per minute under varying conditions of line pressure and number of passes. The TAPPI gloss of each supercalendered sheet was measured and the results are set forth in Table IV below.

Table IV

| Line Pressure lb/in | No. of passes | TAPPI Gloss units |
|---|---|---|
| 250 | 5 | 25 |
| 250 | 10 | 28 |
| 500 | 5 | 28 |
| 500 | 10 | 31 |
| 1000 | 5 | 34 |
| 1000 | 10 | 37 |

These results show that if the coated sheets are subjected to more than about 5 passes through the supercalender at an effective line pressure of 500 pounds/linear inch or if the line pressure is increased above about 500 pounds/linear inch, the gloss is raised above the level which can be regarded as representing a semi-matt finish.

What is claimed is:

1. A method of producing a coated paper having a semi-matt finish which method comprises (A) coating a base paper with a paper coating composition which comprises a dispersion of a pigment in an aqueous medium containing an adhesive, said pigment essentially consisting of (a) a kaolin clay, of which at least 75 percent by weight of the particles have an equivalent spherical diameter smaller than two microns, and having no particles having an equivalent spherical diameter larger than 100 microns and (b) a calcium carbonate pigment which is a natural chalk whiting formed from the remains of coccoliths and which constitutes from 40 to 75 percent by weight of the pigment, and (B) subjecting the coated base paper to a light supercalendering treatment in which the product of the number of passes of the coated paper between the nip of a pair of supercalendering rolls and the effective line pressure, in pounds per linear inch, does not exceed about 2500 and the effective line pressure does not exceed about 500 pounds per linear inch.

2. A method of producing a coated paper according to claim 1, wherein said coating composition comprises from 10 to 25 parts by weight of said adhesive and from 50 to 125 parts by weight of water for each 100 parts by weight of mixed pigment.

3. A method of producing a coated paper according to claim 1, wherein the natural chalk comprises from 30 to 50 percent by weight of particles having an equivalent spherical diameter smaller than 2 microns.

4. A method of producing a coated paper according to claim 1, wherein said kaolin clay contains from 75 percent to 85 percent by weight of particles smaller than 2 microns equivalent spherical diameter, not more than 0.5 percent by weight of particles larger than 10 microns equivalent spherical diameter, and not more than 0.02 percent by weight of particles larger than 53 microns.

5. A method of producing a coated paper according to claim 1, wherein semi-matte finish has a surface gloss of from 15 to 30 T.A.P.P.I. gloss units.

* * * * *